US008936291B2

(12) United States Patent
Yasuda et al.

(10) Patent No.: US 8,936,291 B2
(45) Date of Patent: Jan. 20, 2015

(54) ROBOT HAND, ROBOT SYSTEM, AND METHOD FOR MANUFACTURING WORKPIECE

(71) Applicant: Kabushiki Kaisha Yaskawa Denki, Kitakyushu-shi (JP)

(72) Inventors: Yuya Yasuda, Kitakyushu (JP); Shinji Murai, Kitakyushu (JP); Toshimitsu Irie, Kitakyushu (JP); Fuminori Kutsukake, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/760,070

(22) Filed: Feb. 6, 2013

(65) Prior Publication Data
US 2013/0309057 A1 Nov. 21, 2013

(30) Foreign Application Priority Data
May 21, 2012 (JP) .................................. 2012-115658

(51) Int. Cl.
B66C 1/42 (2006.01)
B25J 15/08 (2006.01)
B25J 9/00 (2006.01)
B25J 15/00 (2006.01)

(52) U.S. Cl.
CPC .. B25J 15/08 (2013.01); B25J 9/00 (2013.01); B25J 15/0047 (2013.01); Y10S 901/39 (2013.01)
USPC ........................... 294/119.1; 294/213; 901/39

(58) Field of Classification Search
USPC ............. 294/86.4, 106, 213, 902, 119.1, 207; 623/57, 64; 414/729, 806; 901/31–34, 901/36–39
See application file for complete search history.

(56) References Cited

U.S. PATENT DOCUMENTS

| | | | | |
|---|---|---|---|---|
| 3,139,302 A | * | 6/1964 | Orloff et al. | 294/198 |
| 5,108,140 A | * | 4/1992 | Bartholet | 294/106 |
| 5,762,390 A | * | 6/1998 | Gosselin et al. | 294/106 |
| 6,015,174 A | | 1/2000 | Raes et al. | |
| 6,435,582 B1 | * | 8/2002 | DaSilva et al. | 294/94 |
| 8,182,197 B2 | | 5/2012 | Meisho | |
| 2004/0074320 A1 | | 4/2004 | Itoh | |
| 2010/0176615 A1 | * | 7/2010 | Okuda et al. | 294/106 |
| 2011/0129325 A1 | * | 6/2011 | Takahashi | 414/800 |

(Continued)

FOREIGN PATENT DOCUMENTS

| | | |
|---|---|---|
| JP | 10-249775 | 9/1998 |
| JP | 2009-154253 | 7/2009 |
| JP | 2010-131743 | 6/2010 |

(Continued)

OTHER PUBLICATIONS

Japanese Office Action for corresponding JP Application No. 2012-115658, Mar. 18, 2014.

(Continued)

Primary Examiner — Steven Vu
(74) Attorney, Agent, or Firm — Mori & Ward, LLP (57) ABSTRACT

This robot hand includes a first finger portion and a second finger portion being relatively movable in a direction in which an object to be grasped is grasped and bar-shaped claw members fixed to the first finger portion and the second finger portion. A plurality of claw members are fixed in parallel to at least either the first finger portion or the second finger portion.

16 Claims, 7 Drawing Sheets

(56) References Cited

U.S. PATENT DOCUMENTS

2011/0222995 A1 9/2011 Irie et al.
2011/0265311 A1 11/2011 Kondo et al.

FOREIGN PATENT DOCUMENTS

| | | |
|---|---|---|
| JP | 2011-073100 | 4/2011 |
| JP | 2011-177863 | 9/2011 |
| JP | 2011-183537 | 9/2011 |
| JP | 2011-218448 | 11/2011 |
| JP | 2011-230239 | 11/2011 |
| JP | 2012-024884 | 2/2012 |
| WO | 2008/067846 | 6/2008 |

OTHER PUBLICATIONS

Extended European Search Report for corresponding EP Application No. 13154359.7-1712, Oct. 2, 2013.
Japanese Office Action for corresponding JP Application No. 2012-115658, Jan. 7, 2014.

* cited by examiner

FIRST MODIFICATION

SECOND MODIFICATION

FIG. 13

SECOND MODIFICATION

ROBOT HAND, ROBOT SYSTEM, AND METHOD FOR MANUFACTURING WORKPIECE

CROSS-REFERENCE TO RELATED APPLICATIONS

The priority application number JP2012-115658, Robot Hand, Robot System, and Method for Manufacturing Workpiece, May 21, 2012, Yuya Yasuda, Shinji Murai, Toshimitsu Irie, and Fuminori Kutsukake, upon which this patent application is based is hereby incorporated by reference.

BACKGROUND OF THE INVENTION

1. Field of the Invention

The present invention relates to a robot hand, a robot system, and a method for manufacturing a workpiece.

2. Description of the Background Art

A robot hand including claw members is known in general. Japanese Patent Laying-Open No. 2012-024884 discloses a grasping conveying device (robot system) including a holding movable body (robot hand) mounted on the forward end of an arm.

SUMMARY OF THE INVENTION

A robot hand according to a first aspect includes a first finger portion and a second finger portion being relatively movable in a direction in which an object to be grasped is grasped and bar-shaped claw members fixed to the first finger portion and the second finger portion, while a plurality of claw members are fixed in parallel to at least either the first finger portion or the second finger portion.

A robot system according to a second aspect includes a robot, a robot hand mounted on the robot, and a robot controller controlling the robot and the robot hand, while the robot hand includes a first finger portion and a second finger portion being relatively movable in a direction in which an object to be grasped is grasped and bar-shaped claw members fixed to the first finger portion and the second finger portion, and a plurality of claw members are fixed in parallel to at least either the first finger portion or the second finger portion.

A method for manufacturing a workpiece according to a third aspect is a method for manufacturing a workpiece employing a robot hand including a first finger portion and a second finger portion being relatively movable in a direction in which an object to be grasped is grasped and bar-shaped claw members fixed to the first finger portion and the second finger portion, while a plurality of claw members are fixed in parallel to at least either the first finger portion or the second finger portion, and includes grasping and taking out the object to be grasped by the claw members fixed to the first finger portion and the second finger portion of the robot hand and applying a prescribed treatment to the object to be grasped taken out by the robot hand.

DESCRIPTION OF THE EMBODIMENTS

An embodiment is now described with reference to the drawings.

First, the structure of a robot system 100 according to this embodiment is described with reference to FIGS. 1 to 9.

Figure 1:
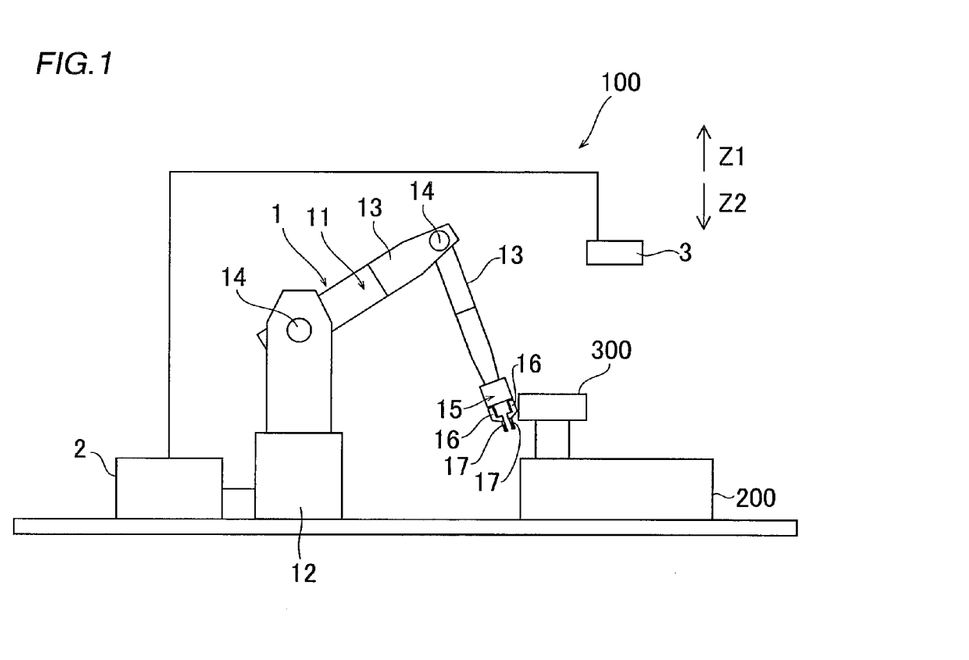
FIG. 1 is an overall side view of a robot system according to an embodiment.
Figure 2:
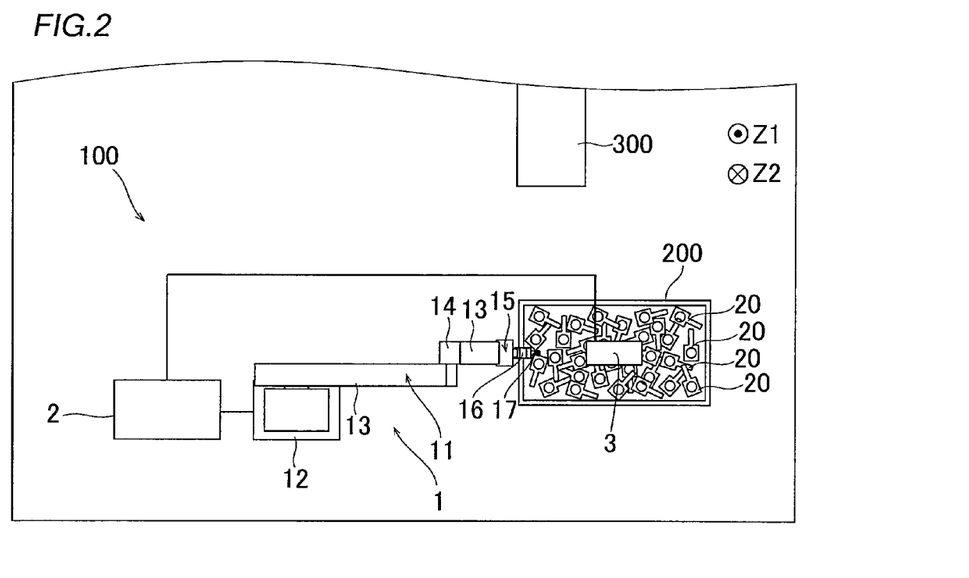
FIG. 2 is an overall top view of the robot system according to the embodiment.

As shown in FIGS. 1 and 2, the robot system 100 according to this embodiment includes a robot 1, a hand portion 15 mounted on the robot 1, a robot controller 2 controlling the robot 1 and the hand portion 15, and a three-dimensional measurement unit 3 connected to the robot controller 2. The hand portion 15 is an example of the "robot hand".

A box-shaped stocker 200 in which a plurality of works 20 are arranged (stacked) randomly and a device (processing machine or the like) 300 for subsequent steps applying a prescribed treatment (processing treatment for increasing dimensional accuracy, for example) to a work 20 taken out from the stocker 200 are arranged adjacent to the robot system 100. As shown in FIG. 2, the works 20 are components such as con rods (connecting rods) each having convex portions (corners) 21, a hole 22, and a bar-shaped portion 23 (see FIGS. 5 to 9) described later. The works 20 are examples of the "object to be grasped".

As shown in FIGS. 1 and 2, the robot 1 is an articulated robot including a robot arm 11. The robot arm 11 has a base 12, a plurality of arm portions 13 connected to the base 12 while being coupled with each other, and a plurality of joints 14 (drive joints) provided between the base 12 and the arm portions 13 connected to the base 12 and between the plurality of arm portions 13 coupled with each other. According to this embodiment, each of the joints 14 is configured to serve as an actuator having a servomotor and a speed reducer. The servomotor of each of the joints 14 is connected to be capable of communicating with the robot controller 2, and the robot controller 2 is configured to control movements of the joints 14.

The hand portion 15 is mounted on the forward end of the robot arm 11. This hand portion 15 includes a pair of finger portions 16 having claw members 17, described later, to grasp the work 20. The finger portions 16 are examples of the "first finger portion" or the "second finger portion".

In the hand portion 15, an unshown actuator to drive the pair of finger portions 16 is provided, and driving of this actuator is controlled by the robot controller 2. Thus, the pair of finger portions 16 are movable in a direction approaching each other (direction in which the work 20 is held between the claw members 17 and grasped) (along arrow A) and a direction separating from each other (along arrow B), as shown in FIG. 3.

Figure 3:
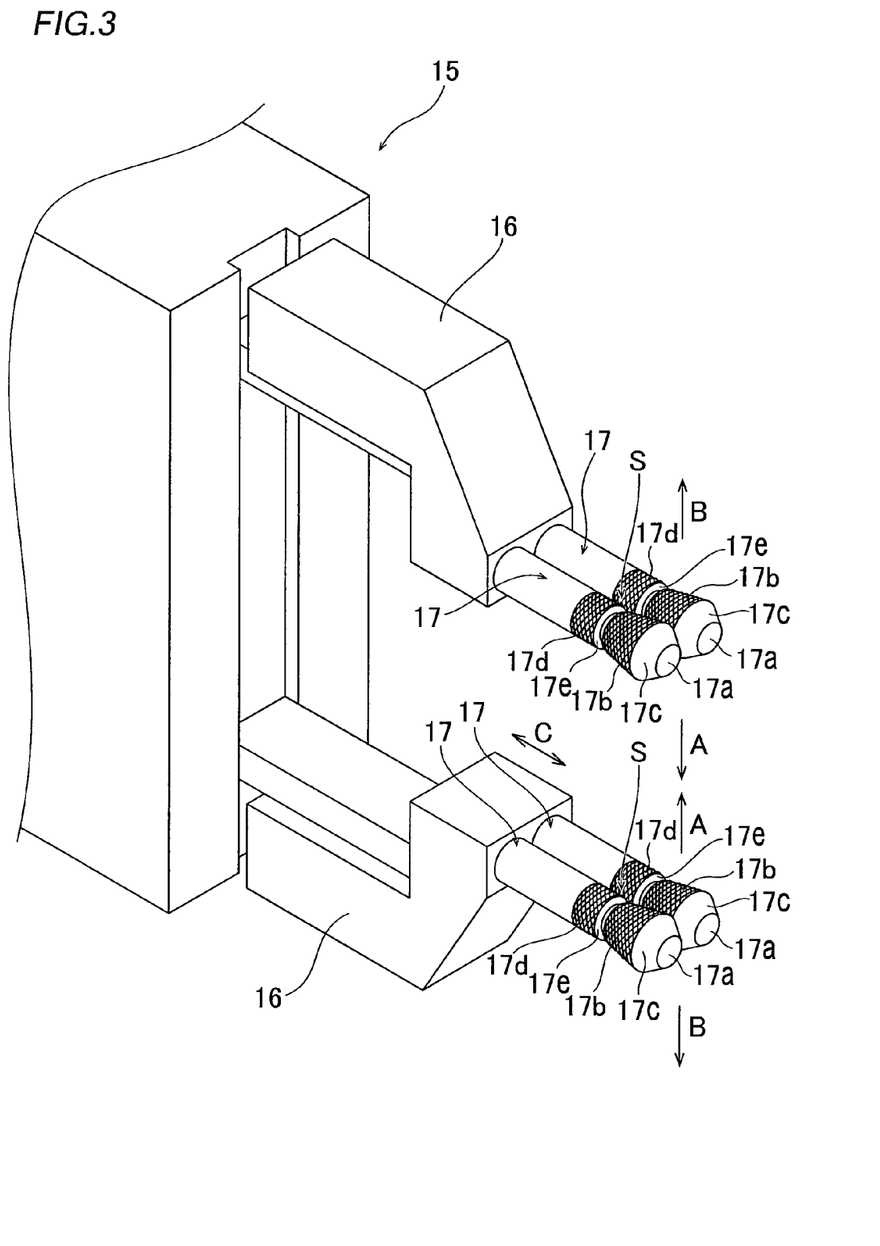
FIG. 3 is a perspective view showing the overall structure of a hand portion according to the embodiment.
Figure 4:
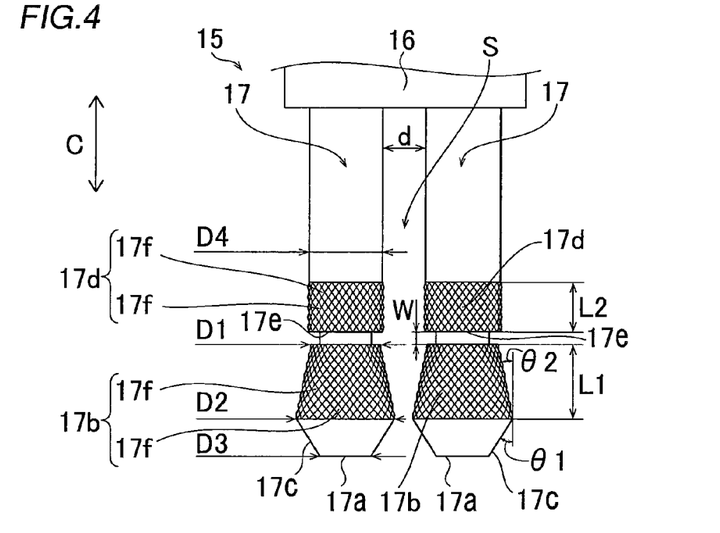
FIG. 4 is an enlarged view showing claw members of the hand portion according to the embodiment.

According to this embodiment, the two round bar-shaped claw members 17 each having a circular section (see FIGS. 5, 6, and 9) are fixed in parallel at a prescribed interval d (see FIG. 4) to the forward end of each of the pair of finger portions 16, as shown in FIGS. 3 and 4. Thus, a prescribed clearance S into which one of the convex portions 21 of the work 20 fits (see FIG. 5) when the work 20 having the convex portions 21 is held between the pair of finger portions 16 and grasped is formed between the two claw members 17 provided on each of the pair of finger portions 16.

In other words, the interval d (see FIG. 4) between the two claw members 17 fixed in parallel to each of the pair of finger portions 16 is set to such a size that one of the convex portions 21 of the work 20 fits thereinto when the work 20 having the convex portions 21 is held between the pair of finger portions 16 and grasped. Furthermore, the interval d (see FIG. 4) is set to be smaller than the diameter (the smaller outer diameter D1 of a tapered antislip portion 17b described later, the larger outer diameter D2 thereof, and the outer diameter D4 of a uniform outer diameter antislip portion 17d) of each of the claw members 17. The interval d (see FIG. 4) is also set to such a size that tapered antislip portions 17b, described later, of the two claw members 17 mounted on each of the pair of finger portions 16 are not in contact with each other.

As shown in FIG. 4, the tapered antislip portions 17b each having an outer peripheral surface to which an anti-slip treatment (double-cut knurling described later) is applied are provided in portions of the claw members 17 each having a tapered shape on the side of forward ends 17a (portions so formed that the dimensions (outer diameters) thereof in diametrical directions gradually increase from D1 to D2 toward the forward ends 17a). The tapered antislip portions 17b are examples of the "taper portions" or the "antislip portions".

Tapered portions 17c so gradually tapered that from end portions closer to the tapered antislip portions 17b toward the forward ends 17a, the dimensions (outer diameters) thereof in diametrical directions decrease from D2 to D3 are provided in portions of the claw members 17 closer to the forward ends 17a beyond the tapered antislip portions 17b. The tapered portions 17c are examples of the "forward end portions". The inclination angles θ1 (see FIG. 4) of the tapered portions 17c with respect to the extensional direction (direction C) of the claw members 17 are set to be larger than the inclination angles θ2 (see FIG. 4) of the tapered antislip portions 17b.

Uniform outer diameter antislip portions 17d each having an outer peripheral surface to which the anti-slip treatment (double-cut knurling described later) is applied are provided in portions of the claw members 17 closer to base ends beyond oil release groove portions 17e (opposite to the forward ends 17a of the claw members 17), extending with the uniform or substantially uniform outer diameters D4 (see FIG. 4). The outer diameter D4 (see FIG. 4) of each of these uniform outer diameter antislip portions 17d is set to be substantially equal to the smaller outer diameter D1 (see FIG. 4) of each of the tapered antislip portions 17b. The uniform outer diameter antislip portions 17d are examples of the "uniform outer diameter portions" or the "antislip portions". The "uniform outer diameter portions" do not mean that the outer diameters thereof are uniform in a mathematically strict sense, but mean that the external dimensions thereof fall within substantially the same range as compared with the tapered antislip portions 17b and the tapered portions 17c.

Oil release groove portions 17e to release oil (not shown) applied to the work 20 are provided in the vicinity of portions of the claw members 17 coming into contact with the work 20 (boundary portions between the tapered antislip portions 17b and the uniform outer diameter antislip portions 17d). The oil release groove portions 17e are examples of the "groove portions". These oil release groove portions 17e are circumferentially formed in outer peripheral portions of the claw members 17. The oil release groove portions 17e each has a rectangular section, and has a groove width W (see FIG. 4) smaller than the length L1 of each of the tapered antislip portions 17b and the length L2 of each of the uniform outer diameter antislip portions 17d in the extensional direction (direction C) of the claw members 17.

The tapered antislip portions 17b and the uniform outer diameter antislip portions 17d are provided in the portions (see FIGS. 5 to 9) of the claw members 17 coming into contact with the work 20. Specifically, the tapered antislip portions 17b and the uniform outer diameter antislip portions 17d are arranged in portions of the claw members 17 closer to the forward ends 17a with respect to the oil release groove portions 17e and portions of the claw members 17 closer to the finger portions 16 with respect to the oil release groove portions 17e, respectively. The length L1 (see FIG. 4) of each of the tapered antislip portions 17b in the extensional direction (direction C) of the claw members 17 is set to be larger than the length L2 (see FIG. 4) of each of the uniform outer diameter antislip portions 17d in the direction C.

As shown in FIG. 4, the tapered antislip portions 17b and the uniform outer diameter antislip portions 17d include a plurality of protrusions 17f protruding in the form of dots outward from the outer peripheral surfaces in the vicinity of the portions (see FIGS. 5 to 9) of the claw members 17 coming into contact with the work 20. In other words, a plurality of grooves extending in a direction intersecting with the extensional direction (direction C) of the claw members 17 are formed at narrow intervals on the outer peripheral surfaces in the vicinity of the portions of the claw members 17 coming into contact with the work 20, and a plurality of portions surrounded by the plurality of grooves protrude outward in the form of dots, whereby the tapered antislip portions 17b and the uniform outer diameter antislip portions 17d are formed. Specifically, the tapered antislip portions 17b and the uniform outer diameter antislip portions 17d are formed by applying the double-cut knurling to the outer peripheral surfaces in the vicinity of the portions of the claw members 17 coming into contact with the work 20.

According to this embodiment, the three-dimensional measurement unit 3 (see FIGS. 1 and 2) connected to the robot controller 2 measures the three-dimensional shapes of the works 20 arranged in the stocker 200 thereby detecting the arrangement states (the arrangement positions, the arrangement postures, etc.) of the works 20 arranged in the stocker 200. As shown in FIG. 1, the three-dimensional measurement unit 3 is fixedly placed above the stocker 200 (along arrow Z1).

The robot controller 2 chooses one (work 20 so positioned as to be most easily grasped) from the plurality of works 20 in the stocker 200 on the basis of information regarding the arrangement states (the arrangement positions, the arrangement postures, etc.) of the works 20 in the stocker 200 detected by the three-dimensional measurement unit 3, and controls the hand portion 15 to grasp the work 20. Furthermore, the robot controller 2 controls the hand portion 15 to grasp the work 20 that is an object to be grasped in a proper grasping mode (grasping mode in which the work 20 can be most stably grasped, for example) when the work 20 that is an object to be grasped is chosen as described above.

Next, three typical grasping modes of the hand portion 15 with respect to the work 20 are described with reference to FIGS. 5 to 9.

(Grasping Mode in which Work 20 is Grasped by Holding Convex Portion (Corner) 21 of Work 20)

Figure 5:
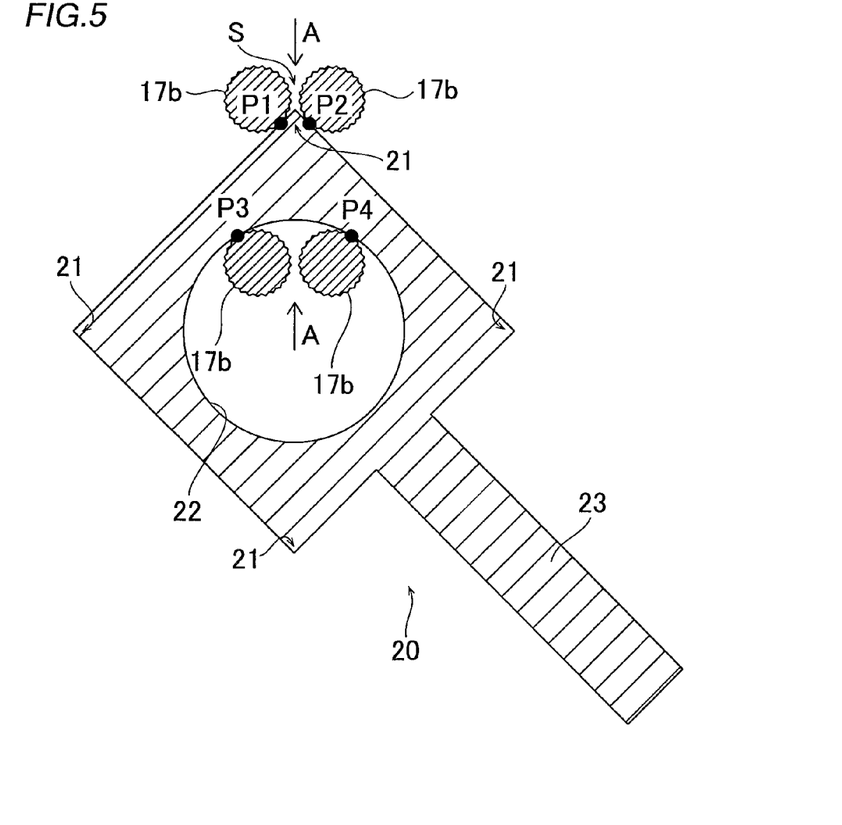
FIG. 5 is a schematic sectional view showing the claw members of the hand portion according to the embodiment, holding one of convex portions (corners) of a work therebetween and grasping the work.

In this grasping mode, the robot controller 2 (see FIGS. 1 and 2) performs control to move the pair of finger portions 16 in the direction approaching each other (along arrow A) while the two claw members 17 of a first finger portion of the pair of finger portions 16 of the hand portion 15 are arranged on the outer peripheral side of a convex portion (corner) 21 of the work 20 and the two claw members 17 of a second finger portion of the pair of finger portions 16 are arranged on the inner peripheral side of the hole 22 of the work 20, as shown in FIG. 5. Thus, the two claw members 17 (tapered antislip portions 17b) of the first finger portion of the pair of finger portions 16 come into point contact with the outer periphery of the convex portion 21 at two points (points P1 and P2) in the vicinity of the tip of the convex portion 21 of the work 20, and the two claw members 17 (tapered antislip portions 17b) of the second finger portion come into point contact with the inner periphery of the hole 22 of the work 20 at two points (Points P3 and P4). Consequently, the vicinity of the tip of the convex portion 21 of the work 20 is held in the clearance S between the two claw members 17 of the first finger portion in a state where the two claw members 17 of the first finger portion of the pair of finger portions 16 are arranged close to each other, and the work 20 is grasped.

(Grasping Mode in which Work 20 is Grasped by Pushing Hole 22 of Work 20 from Inner Peripheral Side)

Figure 6:
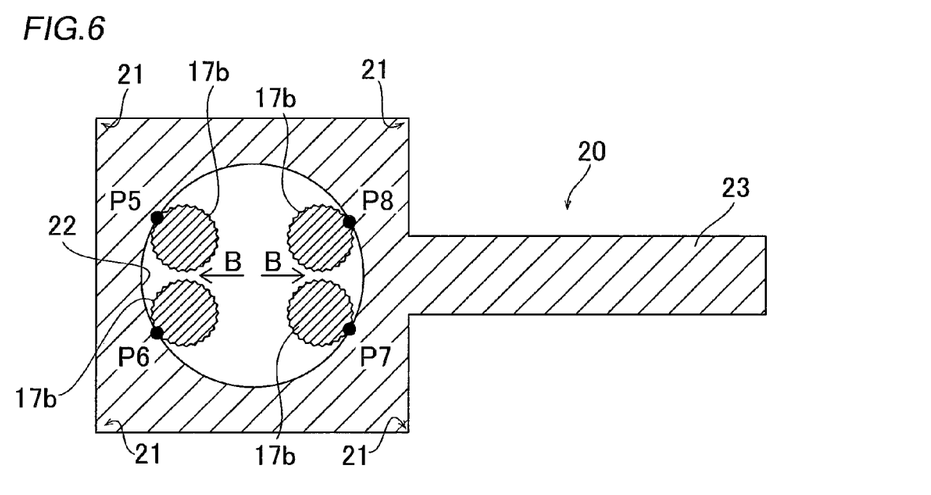
FIG. 6 is a schematic sectional view showing the claw members of the hand portion according to the embodiment, pushing a hole of the work from the inner peripheral side and grasping the work.

In this grasping mode, the robot controller 2 (see FIGS. 1 and 2) performs control to move the pair of finger portions 16 in the direction separating from each other (along arrow B) while a total of four claw members 17 mounted in pairs on the pair of finger portions 16 of the hand portion 15 are inserted into the circular hole 22 of the work 20, as shown in FIG. 6. Thus, the four claw members 17 (tapered antislip portions 17b) mounted on the pair of finger portions 16 come into point contact with the inner periphery of the hole 22 of the work 20 at four points (Points P5, P6, P7, and P8). Consequently, the inner periphery of the hole 22 of the work 20 is pushed by the four claw members 17 from the inner peripheral side, and the work 20 is grasped.

Figure 7:
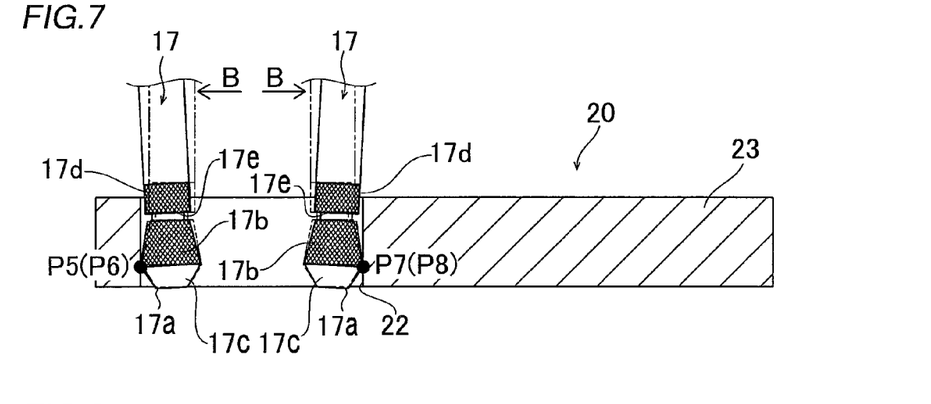
FIG. 7 is a schematic sectional view showing the claw members in FIG. 6, that is warped.
Figure 8:
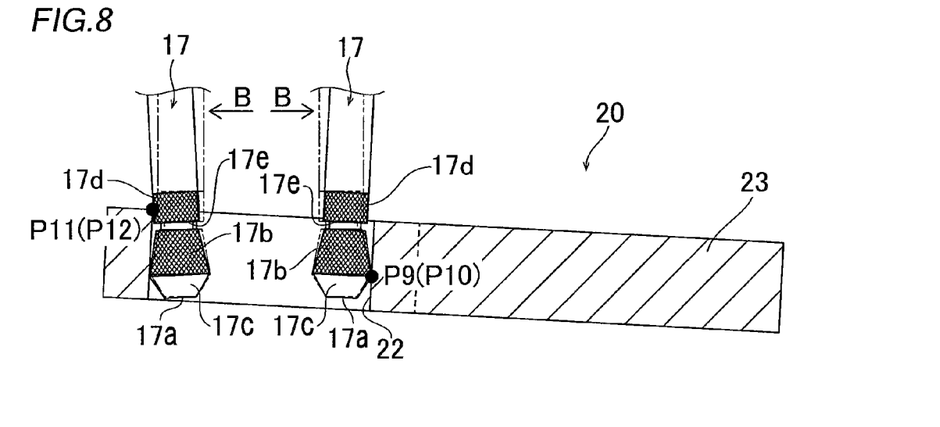
FIG. 8 is a schematic sectional view showing the work in FIG. 7, that is inclined.

In this grasping mode, the claw members 17 may warp if the pair of finger portions 16 are further moved in the direction separating from each other (along arrow B) in a state where the four claw members 17 are in point contact with the inner periphery of the hole 22 of the work 20, as shown in FIGS. 7 and 8. FIG. 7 shows a state where the work 20 is substantially horizontally grasped by the claw members 17. In FIG. 7, the tapered antislip portions 17b of the four claw members 17 are in point contact with the inner periphery of the hole 22 of the work 20 at the four points (Points P5 to P8), similarly to in the aforementioned FIG. 6. FIG. 8 shows a state where the work 20 is obliquely grasped by the claw members 17. In FIG. 8, among the four claw members 17, the tapered antislip portions 17b of the two claw members 17 of the first finger portion are in point contact with the inner periphery of the hole 22 of the work 20 at two points (Points P9 and P10), similarly to in the aforementioned FIGS. 6 and 7 while the uniform outer diameter antislip portions 17d of the two claw members 17 of the second finger portion are in point contact with the inner periphery of the hole 22 of the work 20 at two points (Points P11 and P12), dissimilarly to in the aforementioned FIGS. 6 and 7.

(Grasping Mode in which Work 20 is Grasped by Holding Bar-Shaped Portion 23 of Work 20)

Figure 9:
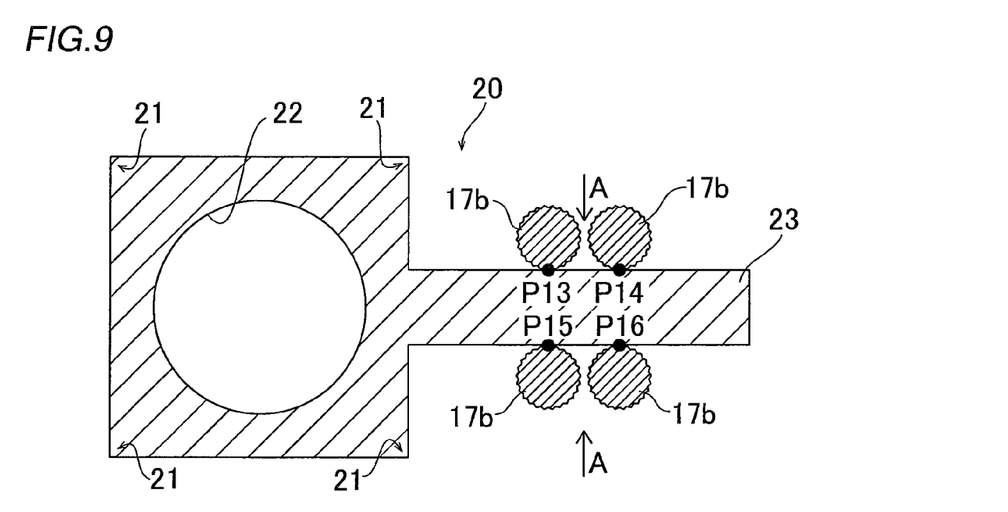
FIG. 9 is a schematic sectional view showing the claw members of the hand portion according to the embodiment, holding a bar-shaped portion of the work therebetween and grasping the work.

In this grasping mode, the robot controller 2 (see FIGS. 1 and 2) performs control to move the pair of finger portions 16 in the direction approaching each other (along arrow A) while the two claw members 17 of a first finger portion of the pair of finger portions 16 of the hand portion 15 are arranged on one side of the bar-shaped portion 23 of the work 20 and the two claw members 17 of a second finger portion of the pair of finger portions 16 are arranged on another side of the bar-shaped portion 23 of the work 20, as shown in FIG. 9. Thus, the four claw members 17 (tapered antislip portions 17b) mounted on the pair of finger portions 16 come into point contact with the bar-shaped portion 23 of the work 20 at four points (Points P13, P14, P15, and P16). Consequently, the bar-shaped portion 23 of the work 20 is held by the four claw members 17, and the work 20 is grasped.

According to this embodiment, the work 20 may be grasped in a grasping mode other than the aforementioned three grasping modes, but description is omitted for simplification.

According to this embodiment, as hereinabove described, the two claw members 17 are fixed in parallel to each of the pair of finger portions 16, and the interval d (see FIG. 4) between the two claw members 17 is set to such a size that one of the convex portions 21 of the work 20 fits thereinto when the work 20 having the convex portions 21 is held between the pair of finger portions 16 and grasped. Thus, one of the convex portions 21 of the work 20 can be held in the clearance S (see FIG. 5) between the two claw members 17 fixed in parallel to each of the pair of finger portions 16, and hence the work 20 can be stably grasped without providing an actuator driving the two claw members 17 individually to adjust the interval d between the two claw members 17. Consequently, the work 20 can be stably grasped without complicating the structure. Furthermore, in this robot system 100, the structure of the hand portion 15 is not complicated, and hence control of the hand portion 15 by the robot controller 2 can be inhibited from complication.

According to this embodiment, as hereinabove described, the hand portion 16 is configured to hold the vicinity of the tip of the convex portion 21 of the work 20 in the clearance S (see FIG. 5) between the two claw members 17 in the state where the two claw members 17 are arranged close to each other, and grasp the work 20. Thus, the convex portion 21 of the work 20 can be inhibited from coming off the clearance S between the two claw members 17 dissimilarly to a case where the two claw members 17 are distanced from each other, and hence the work 20 can be more stably grasped.

According to this embodiment, as hereinabove described, the interval d (see FIG. 4) between the two claw members 17 is set to be smaller than the diameter (the smaller outer diameter D1 of the tapered antislip portion 17b, the larger outer diameter D2 thereof, and the outer diameter D4 of the uniform outer diameter antislip portion 17d) of each of the claw members 17. Thus, when the vicinity of the tip of the convex portion 21 of the work 20 is held in the clearance S (see FIG. 5) between the two claw members 17, the two claw members 17 holding the convex portion 21 therebetween can be easily arranged close to each other.

According to this embodiment, as hereinabove described, the tapered antislip portions 17b so formed that the outer diameters thereof increase from D1 to D2 (see FIG. 4) toward the forward ends 17a on the side opposite to the finger portions 16 are provided in the portions (see FIGS. 5 to 9) of the claw members 17 coming into contact with the work 20. Thus, the tapered antislip portions 17b can inhibits the work 20 grasped by the claw members 17 from coming off to the side of the forward ends 17a of the claw members 17.

According to this embodiment, as hereinabove described, the uniform outer diameter antislip portions 17d extending toward the tapered antislip portions 17b with the uniform or substantially uniform outer diameter D4 (see FIG. 4) are provided in the portions of the claw members 17 closer to the finger portions 16 beyond the tapered antislip portions 17b. Thus, the two claw members 17 can be easily arranged parallel to each other along the extensional direction (direction C) of the uniform outer diameter antislip portions 17d, and hence the clearance S into which the convex portion 21 of the work 20 fits can be easily formed between the two claw members 17.

According to this embodiment, as hereinabove described, the tapered portions 17c tapered from the end portions closer to the tapered antislip portions 17b toward the forward ends 17a are provided in the portions of the claw members 17 closer to the forward ends 17a beyond the tapered antislip portions 17b. Thus, the forward ends 17a of the claw members 17 are tapered, and hence the forward ends 17a of the claw members 17 can be smoothly inserted into the hole 22 of the work 20.

According to this embodiment, as hereinabove described, the tapered antislip portions 17b each having the outer peripheral surface to which the anti-slip treatment (double-cut knurling) is applied are provided in the portions of the claw members 17 each having the tapered shape on the side of the forward ends 17a (portions so formed that the outer diameters thereof gradually increase from D1 to D2 toward the forward ends 17a opposite to the finger portions 16). Thus, the tapered antislip portions 17b can inhibit the work 20 grasped by the portions of the claw members 17 each having the tapered shape from sliding and coming off the claw members 17.

According to this embodiment, as hereinabove described, the uniform outer diameter antislip portions 17d each having the outer peripheral surface to which the anti-slip treatment (double-cut knurling) is applied are provided in the portions of the claw members 17 closer to the finger portions 16 beyond the portions each having the tapered shape (portions of the claw members 17 extending toward the tapered antislip portions 17b with the uniform or substantially uniform outer diameters D4), similarly to the portions of the claw members 17 each having the tapered shape on the side of the forward ends 17a (portions of the claw members 17 provided with the tapered antislip portions 17b). Thus, two types of antislip portions (the tapered antislip portions 17b and the uniform outer diameter antislip portions 17d) provided on portions of the claw members 17 likely to come into contact with the work 20 can effectively inhibit the work 20 grasped by the claw members 17 from sliding and coming off the claw members 17.

According to this embodiment, as hereinabove described, the tapered antislip portions 17b and the uniform outer diameter antislip portions 17d include the plurality of protrusions 17f protruding in the form of dots. Thus, the plurality of protrusions 17f protruding in the form of dots can easily inhibit the work 20 grasped by the claw members 17 from sliding and coming off the claw members 17.

According to this embodiment, as hereinabove described, the oil release groove portions 17e to release oil applied to the work 20 are provided in the vicinity of the portions of the claw members 17 coming into contact with the work 20 (boundary portions between the tapered antislip portions 17b and the uniform outer diameter antislip portions 17d). Thus, the oil applied to the work 20 is released into the oil release groove portions 17e, and hence the work 20 grasped by the claw members 17 can be inhibited from sliding on the oil and coming off the claw members 17.

According to this embodiment, as hereinabove described, the oil release groove portions 17e are circumferentially formed in the outer peripheral portions of the claw members 17. Thus, regardless of which portions of the outer peripheral portions of the claw members 17 grasp the work 20, the oil applied to the work 20 can be easily released into the oil release groove portions 17e.

According to this embodiment, as hereinabove described, the oil release groove portions 17e each are formed to have the rectangular section. Thus, the sectional area of each of the oil release groove portions 17e can be rendered larger as compared with a case where the oil release groove portions 17e each are formed to have a V-shaped section, and hence a larger amount of the oil applied to the work 20 can be released into the oil release groove portions 17e.

According to this embodiment, as hereinabove described, the hand portion 15 is configured to push the inner periphery of the hole 22 of the work 20 from the inner peripheral side by the four claw members 17 by moving the pair of finger portions 16 in the direction separating from each other (along arrow B) while the four claw members 17 mounted in pairs on the pair of finger portions 16 are inserted into the hole 22 of the work 20, and grasp the work 20. Thus, the work 20 having the hole 22 can be stably grasped by the four claw members 17.

It should be understood by those skilled in the art that various modifications, combinations, sub-combinations, and alterations may occur depending on design requirements and other factors insofar as they are within the scope of the appended claims or the equivalents thereof.

For example, while the two claw members arranged at such an interval that one of the convex portions of the work (object to be grasped) fits thereinto are provided on both of the pair of finger portions in the aforementioned embodiment, the two claw members arranged at such an interval that one of the convex portions of the object to be grasped fits thereinto may alternatively be provided on only one of the pair of finger portions.

While both of the pair of finger portions are movable in the aforementioned embodiment, only one of the pair of finger portions may alternatively be movable so far as the pair of finger portions are relatively movable in the direction in which the object to be grasped is grasped.

Figure 10:
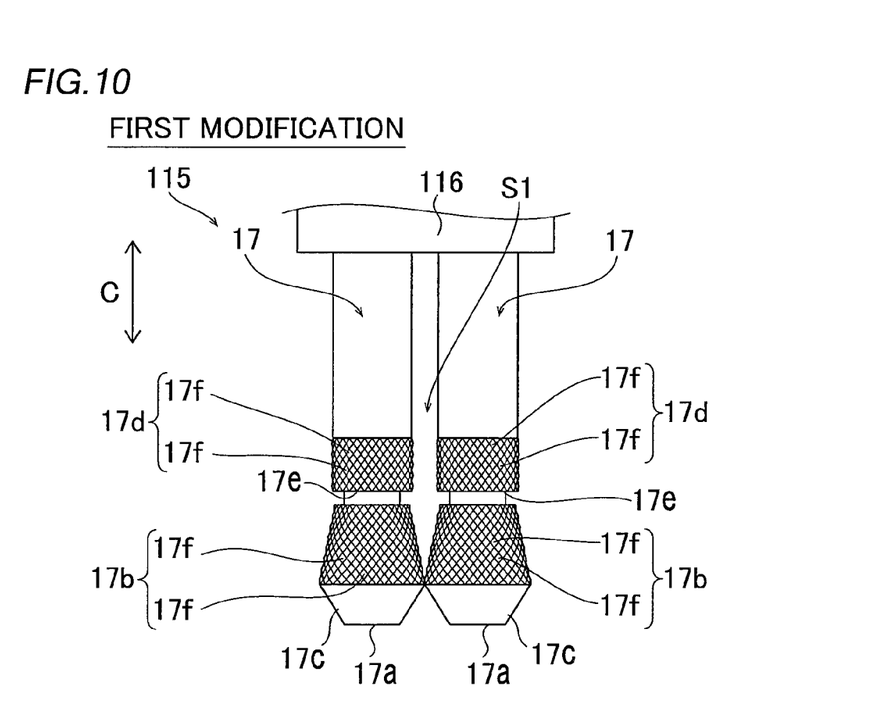
FIG. 10 is an enlarged view showing claw members of a hand portion according to a first modification of the embodiment.

While the two claw members fixed in parallel to each of the pair of finger portions are arranged not to come into contact with each other in the aforementioned embodiment, the two claw members may alternatively be arranged to come into contact with each other so far as such a prescribed interval that one of the convex portions of the work (object to be grasped) fits thereinto is formed between the two claw members. For example, two claw members 17 fixed in parallel to each of a pair of finger portions 116 may alternatively be arranged to come into contact with each other at end portions of tapered antislip portions 17b closer to forward ends 17a, as in a hand portion 115 according to a first modification shown in FIG. 10. Also in this first modification, a clearance S1 (see FIG. 10) into which one of convex portions 21 (see FIGS. 5 to 9) of a work 20 fits is formed between the two claw members 17 similarly to in the aforementioned embodiment, and hence the work 20 can be stably grasped without complicating the structure.

While the pair of (two) finger portions are provided in the aforementioned embodiment, three or more finger portions may alternatively be provided. Furthermore, while the two claw members are provided to form such a prescribed interval that one of the convex portions of the work (object to be grasped) fits thereinto in the aforementioned embodiment, three or more claw members may alternatively be provided so far as it is possible to form such a prescribed interval that one of the convex portions of the object to be grasped fits thereinto.

Figure 11:
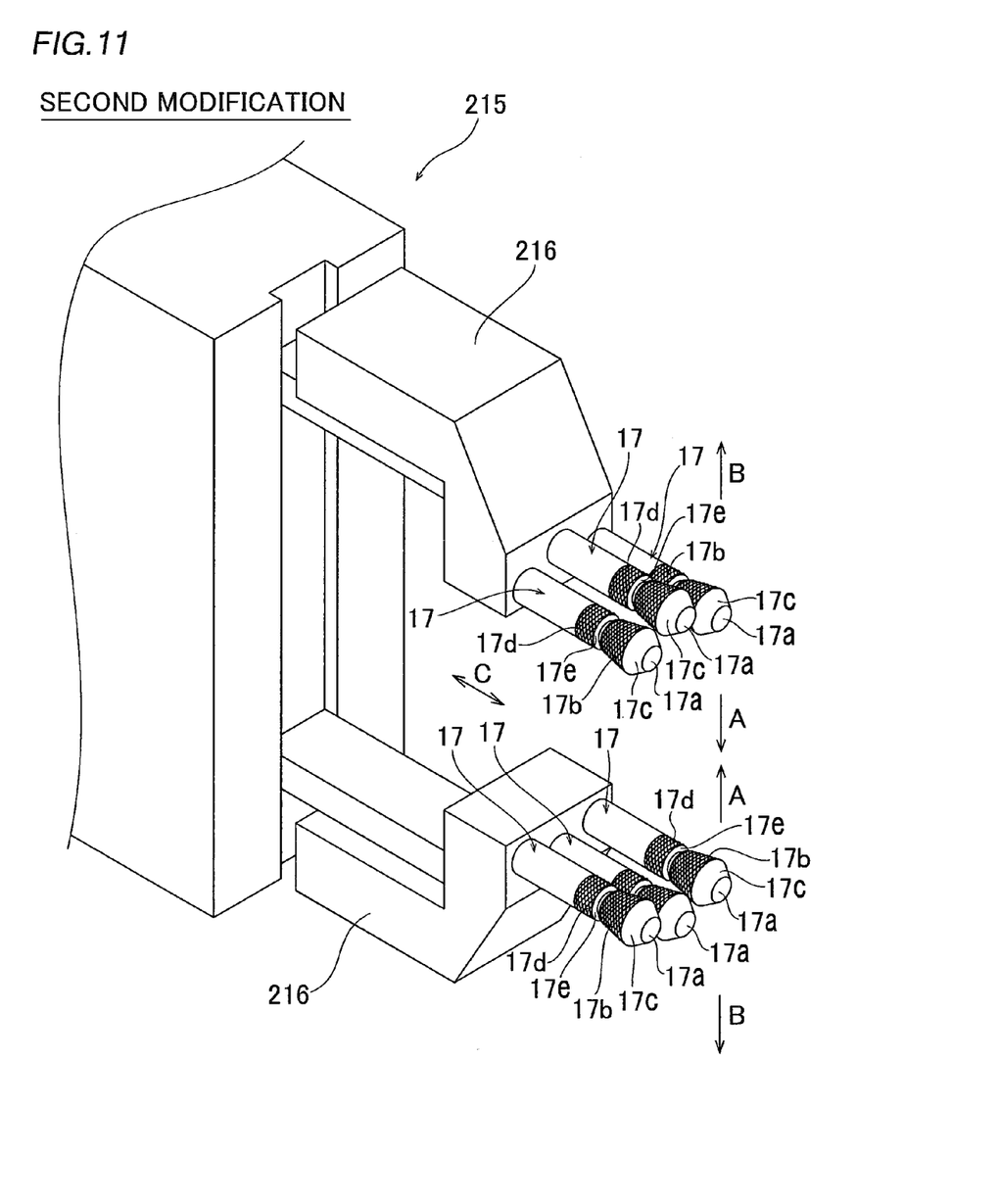
FIG. 11 is a perspective view showing the overall structure of a hand portion according to a second modification of the embodiment.
Figure 12:
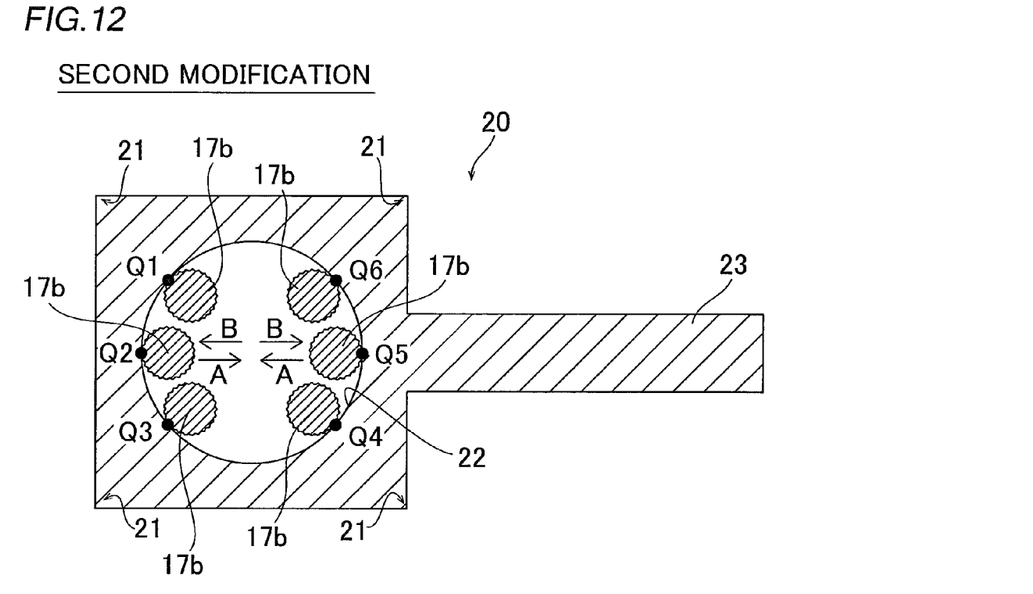
FIG. 12 is a schematic sectional view showing claw members of the hand portion according to the second modification of the embodiment, pushing a hole of a work from the inner peripheral side and grasping the work.
Figure 13:
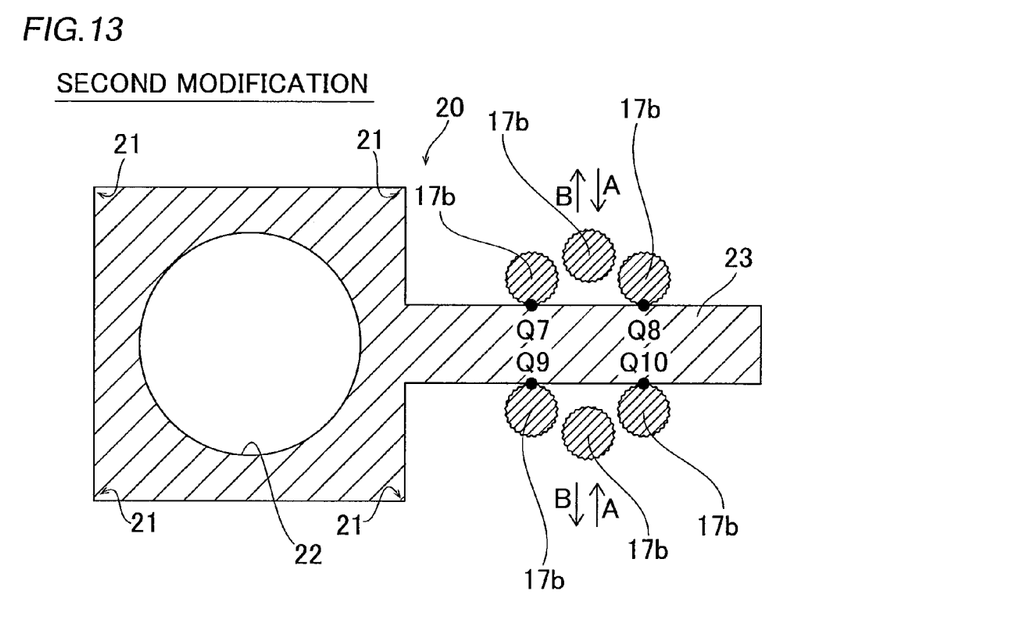
FIG. 13 is a schematic sectional view showing the claw members of the hand portion according to the second modification of the embodiment, holding a bar-shaped portion of the work therebetween and grasping the work.

For example, in a hand portion 215 according to a second modification shown in FIGS. 11 to 13, three claw members 17 each having a structure similar to that of each of the claw members 17 according to the aforementioned embodiment are fixed in parallel to each of a pair of finger portions 216. As shown in FIG. 11, one claw member 17 arranged at the center of the three claw members 17 mounted on each of the pair of finger portions 216 is arranged in a position deviating along arrow B from the other two claw members 17.

According to the second modification, due to the aforementioned structure, a total of six claw members 17 mounted in groups of three on the pair of finger portions 216 come into point contact with a circular hole 22 of a work 20 at six points (Points Q1, Q2, Q3, Q4, Q5, and Q6) when pushing the hole 22 of the work 20 from the inner peripheral side and grasping the work 20, as shown in FIG. 12. Consequently, the work 20 can be more stably grasped as compared with the aforementioned embodiment (see FIG. 6) in which the claw members 17 come into point contact with the hole 22 at the four points when pushing the hole 22 of the work 20 from the inner peripheral side and grasping the work 20.

According to the second modification, four claw members 17 other than two central claw members 17 arranged in positions deviating along arrow B of the six claw members 17 mounted in groups of three on the pair of finger portions 216 come into point contact with a bar-shaped portion 23 of the work 20 at four points (Points Q7, Q8, Q9, and Q10) when the six claw members 17 hold the bar-shaped portion 23 of the work 20 therebetween and grasp the work 20, as shown in FIG. 13.

While the two claw members each are provided in the form of a round bar having a circular section in the aforementioned embodiment, the two claw members each may alternatively be provided in the form of a square bar having a rectangular section so far as it is possible to form such a prescribed interval that one of the convex portions of the work (object to be grasped) fits thereinto between the two claw members.

While the taper portions, the tapered portions, and the oil release groove portions are provided in the claw members in the aforementioned embodiment, no taper portion, tapered portion, or oil release groove portion may alternatively be provided in the claw members. In other words, overall claw members may alternatively be constituted by uniform outer diameter portions extending from finger portions to forward ends with substantially uniform outer diameters.

While the double-cut knurling is applied to the outer peripheral surfaces of the claw members in order to form the antislip portions in the aforementioned embodiment, an antislip treatment other than the double-cut knurling may alternatively be applied to the outer peripheral surfaces of the claw members in order to form the antislip portions.

What is claimed is:

1. A robot hand comprising:
a first finger portion and a second finger portion being relatively movable in a direction in which an object to be grasped is grasped; and
bar-shaped claw members fixed to the first finger portion and the second finger portion,
wherein a plurality of the claw members are fixed in parallel to at least either the first finger portion or the second finger portion,
wherein the claw members include taper portions in such a shape that dimensions in diametrical directions gradually increase, and
wherein the taper portions of the claw members have antislip portions.

2. The robot hand according to claim 1, wherein
an interval between the plurality of claw members fixed in parallel to at least either the first finger portion or the second finger portion is set to such a size that a convex portion of the object to be grasped fits into the interval when the object to be grasped having the convex portion is grasped by the first finger portion and the second finger portion.

3. The robot hand according to claim 2, wherein
each of the claw members has a circular sectional shape, and
the interval between the plurality of claw members is smaller than a diameter of each of the claw members.

4. The robot hand according to claim 1, wherein
the claw members further include uniform outer diameter portions arranged in positions closer to base ends of the claw members beyond the taper portions, extending toward the taper portions with substantially uniform outer diameters.

5. The robot hand according to claim 1, wherein
the claw members further include forward end portions in such a shape that dimensions in diametrical directions gradually decrease from sides closer to the taper portions toward the forward ends of the claw members, arranged in positions closer to forward ends of the claw members beyond the taper portions.

6. The robot hand according to claim 1, wherein
uniform outer diameter portions extending with substantially uniform outer diameters, located in positions closer to base ends of the claw members beyond the taper portions also have antislip portions.

7. The robot hand according to claim 1, wherein
the antislip portions have a plurality of protrusions protruding in the form of dots.

8. The robot hand according to claim 1, wherein
the claw members are provided in pairs on the first finger portion and the second finger portion.

9. A robot hand comprising:
a first finger portion and a second finger portion being relatively movable in a direction in which an object to be grasped is grasped; and
bar-shaped claw members fixed to the first finger portion and the second finger portion,
wherein a plurality of the claw members are fixed in parallel to at least either the first finger portion or the second finger portion, and
wherein the claw members include groove portions having smaller dimensions in diametrical directions.

10. A robot system comprising:
a robot;
a robot hand mounted on the robot; and
a robot controller controlling the robot and the robot hand, wherein the robot hand includes a first finger portion and a second finger portion being relatively movable in a direction in which an object to be grasped is grasped and bar-shaped claw members fixed to the first finger portion and the second finger portion, and a plurality of the claw members are fixed in parallel to at least either the first finger portion or the second finger portion, wherein the claw members include taper portions in such a shape that dimensions in diametrical directions gradually increase, and wherein the taper portions of the claw members have antislip portions.

11. The robot system according to claim 10, wherein an interval between the plurality of claw members fixed in parallel to at least either the first finger portion or the second finger portion is set to such a size that a convex portion of the object to be grasped fits into the interval when the object to be grasped having the convex portion is grasped by the first finger portion and the second finger portion.

12. The robot system according to claim 11, wherein each of the claw members has a circular sectional shape, and the interval between the plurality of claw members is smaller than a diameter of each of the claw members.

13. The robot system according to claim 10, wherein the claw members further include uniform outer diameter portions arranged in positions closer to base ends of the claw members beyond the taper portions, extending toward the taper portions with substantially uniform outer diameters.

14. The robot system according to claim 10, wherein the claw members further include forward end portions in such a shape that dimensions in diametrical directions gradually decrease from sides closer to the taper portions toward the forward ends of the claw members, arranged in positions closer to forward ends of the claw members beyond the taper portions.

15. The robot system according to claim 10, wherein uniform outer diameter portions extending with substantially uniform outer diameters, located on positions closer to base ends of the claw members beyond the taper portions also have antislip portions.

16. A method for manufacturing a workpiece, that is a method for manufacturing a workpiece employing a robot hand including a first finger portion and a second finger portion being relatively movable in a direction in which an object to be grasped is grasped and bar-shaped claw members fixed to the first finger portion and the second finger portion, wherein a plurality of the claw members are fixed in parallel to at least either the first finger portion or the second finger portion, comprising:

grasping and taking out the object to be grasped by the claw members fixed to the first finger portion and the second finger portion of the robot hand; and applying a prescribed treatment to the object to be grasped taken out by the robot hand, wherein the claw members include taper portions in such a shape that dimensions in diametrical directions gradually increase, and wherein the taper portions of the claw members have antislip portions.

* * * * *